Dec. 13, 1966     J. M. LIEBIG     3,291,495
SELF-ALIGNING SEAL
Filed July 7, 1964
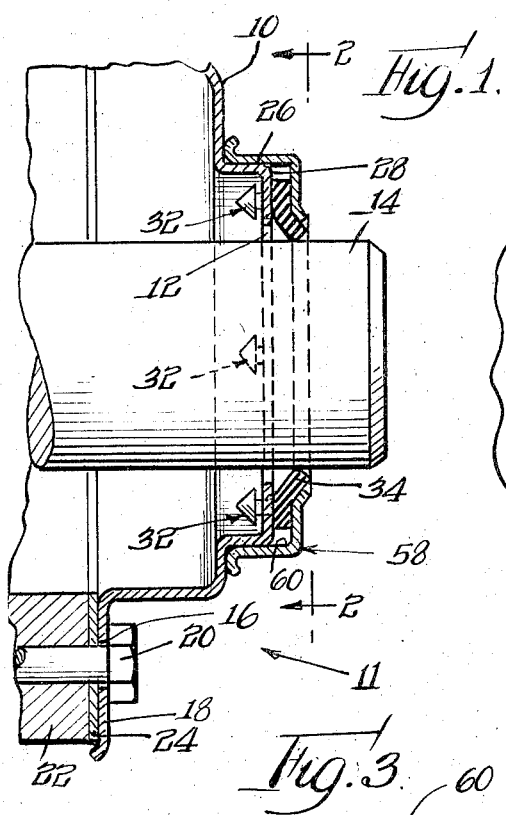
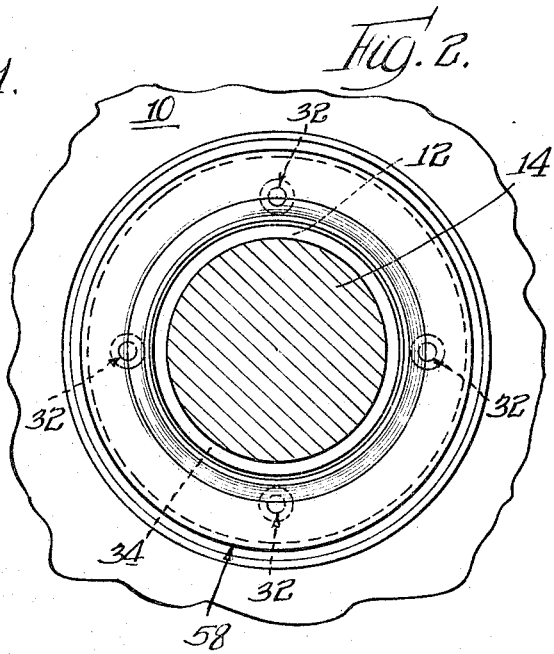
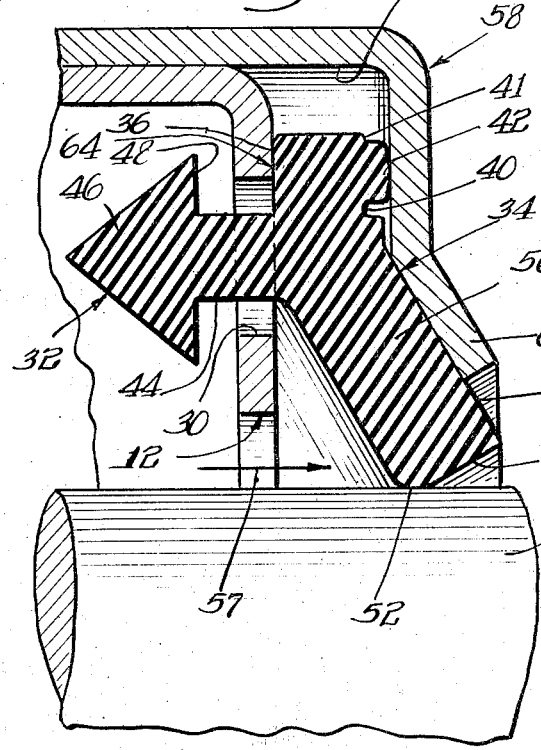
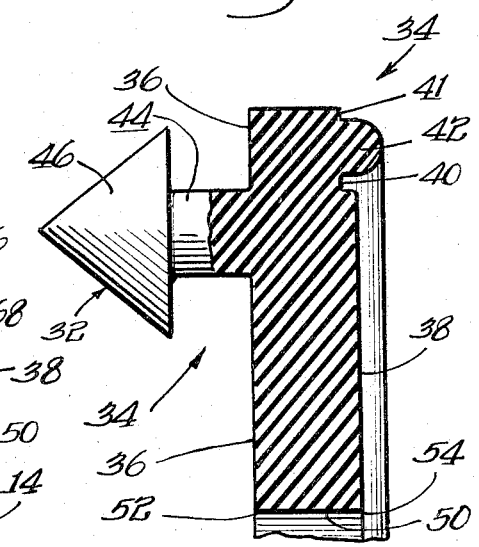
Inventor
Joseph M. Liebig
By: Olson, Trexler
Wolters & Bushnell attys.

United States Patent Office 3,291,495
Patented Dec. 13, 1966

3,291,495
SELF-ALIGNING SEAL
Joseph M. Liebig, Wheaton, Ill., assignor to Illinois Milling, Incorporated, Chicago, Ill., a corporation of Delaware
Filed July 7, 1964, Ser. No. 380,779
10 Claims. (Cl. 277—152)

This invention relates to a novel self-aligning seal for a crankshaft where it projects through a timing chain cover and more particularly relates to an improved construction for sealing an end of a shaft which may project eccentrically through an opening in a timing chain cover.

Generally, a timing chain cover or housing, to enclose the timing gears and chain mechanism, is mounted at the front end of a reciprocating internal combustion engine such as that commonly used in automobiles. The timing chain cover is secured to the front end of the engine block with the engine crankshaft projecting through a central crankshaft opening in the cover.

An oil seal must be provided between the crankshaft and the crankshaft opening to prevent the escape of lubricants supplied to the timing gears and chain mechanisms. The timing chain cover generally is stamped from sheet metal. Since sheet metal stampings generally are not held to close tolerances, the crankshaft opening within the timing chain cover often is not exactly concentric about the crankshaft. This is due in part to the fact that the various bolt openings provided in the timing chain cover for securement of the cover to the engine block are not exactly aligned with complementary holes provided in the engine block for receiving mounting bolts. In fact, such holes are often somewhat oversize, allowing a certain amount of variation in mounting position. Thus, the crankshaft opening is not necessarily concentric with the shaft and the crankshaft may project relatively eccentrically through the opening.

Due to this eccentricity, a problem is presented in sealing the timing chain cover about the crankshaft.

Thus, it is an object of the present invention to provide an improved arrangement for an oil seal affording concentric mounting of the oil seal with respect to the crankshaft projecting through an opening in a housing carrying the oil seal.

Another object is to provide an oil seal construction adapted to be readily positioned in sealing contact to a timing chain cover and in encircling relationship with respect to a crankshaft with means for aligning the oil seal construction concentrically with respect to the crankshaft.

Another object is to provide aligning means in an oil seal to cooperate with means provided on a timing chain cover whereby the oil seal aligns itself concentrically with respect to a crankshaft projecting through an opening in the cover.

Still another object is to provide an oil seal to seal a crankshaft against the escape of fluid from the crankshaft housing, the seal having automatically adjustable mounting means for mounting itself concentrically about a crankshaft.

Still another object is to provide an oil seal having an inner sealing ring suitable for resiliently sealing a crankshaft over a long period of service and capable of adjusting itself automatically over this period to maintain a leak proof construction.

Still another object is to provide an oil seal ring adapted for use with a crankshaft projecting through a crankshaft housing having means on the oil seal ring cooperable with the seal retainer to prevent leakage of oil from the housing.

Other objects and advantages of the invention will become clear from the following description taken in conjunction with the appended claims and drawing wherein like reference numerals designate like parts throughout and in which:

FIG. 1 is a fragmentary side elevational view in section illustrating a seal arrangement embodying the principles of the invention, with a crankshaft shown protruding through an opening provided in a timing mechanism cover and with a retainer member shown securing an oil seal ring about a crankshaft;

FIG. 2 is a sectional view taken along lines 2—2 of FIG. 1;

FIG. 3 is a fragmentary sectional view on an enlarged scale of the seal arrangement illustrated in FIG. 1;

FIG. 4 is a fragmentary axial sectional view showing the oil seal ring of FIG. 3 prior to its assembly about a crankshaft.

There is shown in FIGS. 1 and 3 a timing chain cover or housing 10 enclosing the timing gears and chain mechanism, not shown, of an internal combustion engine 11. The cover 10 has a circular opening 12 through which an end of a crankshaft 14 projects. The cover has various openings 16 in its flange 18 for receipt of cap screws 20 to secure the housing to the front of an engine block 22. A gasket 24 may be inserted between the flange 18 and the engine 22 to effect an oil tight joint when the cap screws are threadedly inserted into the complementary openings provided in the engine block and tightened in place.

The housing 10 has a generally cylindrical forwardly projecting portion 26 and an annular front or outer face 28 with four arcuately spaced ports 30 adapted to receive four rearwardly directed protuberances 32 of a substantially annular oil seal 34.

The oil seal 34 is annular in shape, having a rear face 36 adapted to fit against the housing front face. The seal has a front face 38 which is substantially flat and which has a circular groove 40 and a circumferential shoulder 41 on either side of an annular bead 42 which is partially semi-circular in transverse section and which extends outwardly with respect to the front face 38 of the seal for engagement by retaining means to be hereafter described.

In the embodiment of the invention shown, the rearwardly directed protuberances 32 on the rear face of the annular seal are circumferentially spaced apart and adapted to be inserted into the ports 30 provided in the cover. Each protuberance has a substantially cylindrical stem 44 and a conically shaped button-like member or head 46 at one end thereof and integral therewith. As is apparent from FIG. 3, the conically shaped member 46 has a base 48 with an outer diameter which is relatively greater than the diameter of one of the ports 30.

The protuberances are elastomeric and are of a shape to be readily inserted into the ports without the need for any tools; and are yet retained or locked within the port after insertion by reason of the relatively larger diameter head 46. The stem of each protuberance has an outer diameter which is substantially less than the diameter of a port 30 to permit movement of the seal radially with respect to the crank shaft. In other words, after positioning the protuberances within their respective complementally positioned ports, sufficient clearance is provided between the stems of the protuberances and the edges of the ports for movement of the seal stems upwardly, downwardly, or sidewardly.

The oil seal 34 has a central cylindrical surface or hub 50 having a circular rear edge 52 and a circular front edge 54, the inner diameter of the surface 50 being somewhat less than the outer diameter of the crankshaft. Thus, on positioning the oil seal by pushing the seal protuberances into place in their respective ports against the timing chain housing with the crankshaft in place, the seal adopts a position as shown in FIG. 3 having an outwardly directed partially conically shaped central ring or mouth 56 with the rear edge 52 of the seal resiliently bearing against the crankshaft preventing oil leakage along the crank shaft in the direction of the arrow 57.

The oil seal 34 is formed of a resilient elastomeric material and is advantageously heat and wear resistant to withstand engine heat and the heat and friction caused by rotation of the crank shaft against the edge 52.

Once the oil seal is positioned against the timing chain cover with the forwardly directed ring or mouth 56 about the shaft, the oil seal assumes a position which is concentric with the crankshaft even though the shaft may be eccentric with respect to the timing chain cover.

Retaining means is provided to hold the seal in place and comprises a retaining cover or a retainer 58 that has a generally cylindrical lateral surface 59 and an annular front portion 61. The retainer has an inner cylindrical portion 60 which is complementary to the outer cylindrical surface 26 of the timing chain cover and is adapted to fit tightly about the timing chain cover. Various means may be provided to hold the retainer in position on the cover as by outwardly extending dimples, not shown, on the outer cylindrical surface 26 of the cover, although a press fit is generally sufficient.

The retainer front portion has an inner or rear surface 62 which is generally flat and annular in shape and is adapted to bear against and to compress the annular bead 42 on the outer face of the oil seal. The retainer is press fitted over the timing chain cover and bears against the annular bead compressing it slightly into the groove 40 and shoulder 41 provided and urging the oil seal resiliently into contact with the outer face 28 of the housing to prevent the escape of oil between the two annular surfaces of the oil seal and timing chain cover designated generally by the numeral 64.

The annular front portion 61 of the retainer 58 has a partially conically shaped central ring 68 which in cross section in FIG. 3 appears as a flange bent out at an angle of about 30 degrees with reference to the balance of the surface. The conically shaped inner ring 68 is adapted to hold the central ring 56 of the oil seal in installed position against the crank shaft at substantially the same angle of 30 degrees. As should be apparent, the ring 68 presses against the seal mouth 56 to help position it concentrically about the shaft. The oil seal mouth 56 is maintained in this position resiliently against the crank shaft. As the seal surface 52 begins to wear with use, the mouth moves axially inwardly, that is, the mouth is subjected to tension and as the forces are reduced, the central ring adjusts itself automatically by moving toward its initial position as illustrated in FIG. 4.

Having now described the invention, its mode of operation should be clear; however, for purposes of a better understanding, a functional description without the use of numerical references will now be provided.

The improved oil seal construction of the present invention includes a self aligning oil seal having rearwardly directed protuberances adapted to fit slidingly into openings provided in a timing chain cover. The openings provided for the protuberances are sufficiently large to permit radial movement of the seal with respect to the crankshaft which may project eccentrically through an opening in the housing. Thus, the oil seal readily assumes a position concentrical to the crankshaft despite the possible eccentricity of the crankshaft with respect to the housing.

The oil seal has an inner diameter which is less than the outer diameter of the crankshaft and means are provided to help position the seal concentrically with respect to the crankshaft and to maintain it tightly in sealing position with respect to the timing chain cover. The means provided comprises a retainer clamping an outer portion of the seal in position against the timing chain cover and maintaining an inner portion of the seal resiliently in position against the crankshaft. The inner portion of the seal comprises a sealing lip forming a ring which in the seal's normal unstressed position is substantially flat. When in position against the crankshaft, the lip is maintained at an angle to the shaft, that is, the shaft pushes against the lip maintaining a sealing contact therewith.

While there has been described what is at present considered to be a preferred embodiment of the invention, it will be understood that various modifications may be made therein. Thus, the invention should not be limited thereto; and it is contemplated by the appended claims to cover any modifications as fall within the true spirit and scope of the invention.

The invention is hereby claimed as follows:

1. An oil seal construction for a housing having an opening in a face thereof through which a rotatable shaft projects, said face having a plurality of arcuately spaced bores therein, said seal construction comprising in combination: an annular body of resilient elastomeric material having a front face and a rear face, said body having a hub having a rear circular inner edge and a front circular edge, the inner diameter of said annular body being less than the outer diameter of said shaft, said rear face having a plurality of rearwardly directed protuberances adapted to fit loosely within said housing bores to located said seal about said shaft; and means to hold the oil seal sealingly against said housing face, said means maintaining said seal resiliently in position concentrically about said shaft with the inner edge of said hub in sealing position about said shaft.

2. A seal for preventing the escape of fluid from a housing having a generally central opening in a face thereof with a rotating shaft projecting through said housing, said face having a plurality of spaced apertures therein, said seal comprising in combination: a disc-like body of resilient elastomeric material having a shaft receiving opening therein, said body having a front face and a rear face, said faces being generally circular and substantially flat in relaxed position, said body having an inner periphery comprising shaft sealing means, the inner diameter of said shaft receiving opening being less than the outer diameter of said shaft, said rear face having a plurality of inwardly directed protuberances adapted to fit loosely within said housing apertures to locate said seal about said shaft; retainer means adapted to bias the seal resiliently against said housing with said seal flaring out to form an outwardly convex disc when in position about said shaft with the inner periphery of said body in resilient sealing contact with said shaft.

3. An oil seal construction for a housing having a crankshaft projecting through a central opening in said housing, said housing having a plurality of arcuately spaced openings therein generally equidistant from the axis of said crankshaft, said seal comprising in combination: an annular body of an elastomeric material, said body having a front face and a rear face, said body having an inner hub comprising shaft sealing means, the inner diameter of said hub being less than the outer diameter of said shaft, said rear face having a plurality of inwardly directed protuberances adapted to fit loosely laterally within said arcuately spaced openings in the face of said housing to aid in locating said seal concentrically about said shaft; said body having an inner ring portion radially inwardly of said protuberances, and an outer ring portion radially outwardly of said protuberances, said inner ring portion flaring outwardly from said housing to form an outwardly flared skirt when said seal is positioned about said shaft; an outer retaining cap adapted to fit tightly about the housing to hold said seal securely in position against said housing face; and means on the front face of said seal to resiliently bias said seal circumferentially and inwardly against said housing to prevent leakage of oil therefrom.

4. An oil seal construction for a housing having a crankshaft projecting through a central opening in said housing, said housing having a plurality of arcuately spaced openings therein generally equidistant from the axis of said crankshaft, said seal comprising in combination: an annular body of an elastomeric material, said body having a front face and a rear face, said body having an inner hub comprising shaft sealing means, the inner diameter of said hub being less than the outer diameter of said shaft, said rear face having a plurality of inwardly directed protuberances adapted to fit loosely laterally within said arcuately spaced openings in the face of said housing to aid in locating said seal concentrically about said shaft; said body having an inner ring portion radially inwardly of said protuberances, and an outer ring portion radially outwardly of said protuberances, said inner ring portion flaring outwardly from said housing to form an outwardly flared skirt when said seal is positioned about said shaft; an outer retaining cap adapted to fit tightly about the housing to hold said seal securely in position against said housing face; said cap having an end portion secured thereto, said end portion having an annular outer surface and a flared partially conical inner ring, said inner ring being adapted to fit against said seal to urge said seal into sealing contact with said shaft to effect a fluid tight relationship therewith; and means on the front face of said seal to resiliently bias said seal circumferentially and inwardly against said housing to prevent leakage of oil therefrom.

5. An oil seal for a housing having a circular face, said housing face having an aperture through which a rotatable shaft projects perhaps eccentrically, said face having a plurality of seal positioning openings therein, said seal comprising in combination: an elastomeric disc having a front face and a rear face, said faces being generally flat and circular, said body having a radially outer annular portion and an inner annular portion, said inner annular portion being distended into partially conical shape on being fitted about said shaft, said inner annular portion having a smaller diameter than the outer diameter of said shaft to fit resiliently about said shaft, said rear face having a plurality of inwardly directed protuberances adapted to fit loosely laterally within said openings in the face of said housing to locate said seal about said shaft; said protuberances having an inner stem and an outer substantially larger button portion having a base relatively larger than the diameter of said openings, said protuberances being adapted to be pressed into said opening relatively easily and to be maintained therein by said button portion, said stem being movable laterally in said opening to permit positioning of said seal concentrically with respect to said shaft despite eccentricity of said housing and the openings therein with respect to said shaft; and means to hold said seal in resilient sealing contact about said shaft, said means holding the outer annular portion of the inner face tightly against the housing to prevent the escape of oil therefrom.

6. A seal for preventing the escape of fluid from a housing having a face with an aperture therein through which a crankshaft projects perhaps eccentrically, said housing face having a plurality of circularly disposed openings, said seal comprising an annular disc-like body of resilient elastomeric material having an outer rim and an inner hub with a skirt portion therebetween, said hub having an inner diameter less than the outer diameter of said crankshaft, said skirt portion having a rear face having a plurality of protuberances extending rearwardly from said face and adapted to fit relatively loosely into said circularly disposed openings in the face of said crankshaft housing, said seal being radially movable in the openings to position said seal concentrically with said crankshaft, said skirt being resiliently positioned about said shaft in a flared out fashion to hug said shaft; and retaining means to fit securely about the end of said housing to hold said seal in resilient sealing contact with said housing and with said crankshaft.

7. The oil seal of claim 6 wherein said oil seal has an annular bead on its outer face, said bead being of substantially semi-circular transverse section and projecting forwardly with respect to said face to cooperate with said retaining means to bias said seal against said crankshaft housing to prevent the escape of fluid from said housing.

8. The oil seal of claim 6 including means secured to said retaining means to prevent the movement of said oil seal hub axially outwardly with respect to said crankshaft.

9. A seal for preventing the escaped fluid from a housing having a projection and an axial abutment surface surrounding an aperture through which a rotatable shaft projects perhaps eccentrically, comprising an annular resilient body having a surface complementary to and engaging said abutment surface, said body further having an aperture through which said shaft projects in sealing engagement with said body, said body and said abutment surface having cooperating means approximately positioning said body concentric with the aperture in said abutment surface, said cooperating means permitting limited transverse shifting of said body relative to said abutment surface as said body assumes a concentric position about said shaft, a substantially flat clamping ring clampingly engageable with said body, and means coacting between said clamping ring and said projection for securing said clamping ring in clamping engagement against said body to clamp said body against said abutment surface and thereby permanently to secure said body to said housing concentric with said shaft.

10. A seal as set forth in claim 9 wherein said clamping ring and said coacting means comprises a cup-shaped member forming a press fit on said projection.

References Cited by the Examiner

UNITED STATES PATENTS

| | | | |
|---|---|---|---|
| 1,884,879 | 10/1932 | Sanders | 277—189 X |
| 2,088,180 | 7/1937 | Stevens | 277—187 X |
| 2,979,345 | 4/1961 | Potter | 277—152 X |
| 2,998,987 | 9/1961 | Taschenberg et al. | 277—137 X |
| 3,128,105 | 4/1964 | Liebig | 277—187 |

SAMUEL ROTHBERG, *Primary Examiner.*